Figure 1:
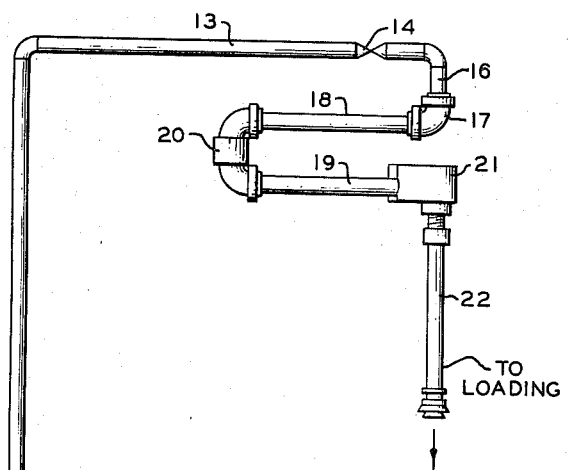

Oct. 25, 1960 W. C. FISHER 2,957,489
ANTI-DRIP TRAP FOR LOADING SPOUT
Filed June 25, 1958

INVENTOR.
W.C. FISHER
BY
ATTORNEYS

United States Patent Office 2,957,489
Patented Oct. 25, 1960

2,957,489
ANTI-DRIP TRAP FOR LOADING SPOUT

William C. Fisher, Bartlesville, Okla., assignor to Phillips Petroleum Company, a corporation of Delaware Filed June 25, 1958, Ser. No. 744,391

2 Claims. (Cl. 137—142)

This invention relates to an anti-drip trap in a loading spout. In another and more specific aspect it relates to an improved, adjustable, non-dripping loading pipe for use in loading tank cars or gasoline transport trucks at refineries or bulk stations.

When loading liquid hydrocarbon products into tank cars, transport trucks and the like, it is necessary to have quick stoppage of product flow after the valve in the supply conduit is shut off. Adjustable loading spouts generally include several lengths of vertical and horizontal conduits which are pivotally connected so that the loading spout can be moved over a wide area as needed to reach the opening of the tank car or transport truck. Thus even though the positive action of the valve in the supply conduit stops the main flow of product, there is a considerable amount of drainage from the walls of the conduits and connections after the main flow is stopped. This results in dripping from the loading spout for several minutes and the accumulations of fuel around the loading platforms present a disturbing nuisance and waste as well as a fire and safety hazard. Since the valves of such a loading system are located upstream from the adjustable section of the spout in order to minimize the amount of leakage around the pivotal connections, this dripping nuisance has been tolerated at loading stations for a considerable period of time.

According to my invention the undesirable dripping from a loading spout after the flow of product has been shut off is substantially eliminated. My invention is particularly attractive because it is simple and inexpensive to install and does not require any change in operating procedure in filling tank trucks, so that the human element which might enter into other solutions to this problem is eliminated. It has been demonstrated that the dripping is stopped positively and automatically within a few seconds after the valve to the loading spout is closed. I accomplish this by providing a reservoir spaced upstream from the lower end of the discharge spout, preferably at a point where the vertical discharge spout connects with a horizontal conduit in the adjustable loading system. This reservoir is positioned to intercept fluid flowing through the pipes so that product draining from the walls of the conduit above the reservoir is collected therein and does not drip out the end of the discharge spout. Positioned in the reservoir is a siphon tube which extends downwardly into the discharge pipe so that at the termination of the loading procedure the reservoir is drained by the siphon tube. The reservoir having thus been evacuated, it is in a position to receive and collect fluid which would otherwise drip out the end of the discharge pipe and accumulate in the loading area.

Figure 2:
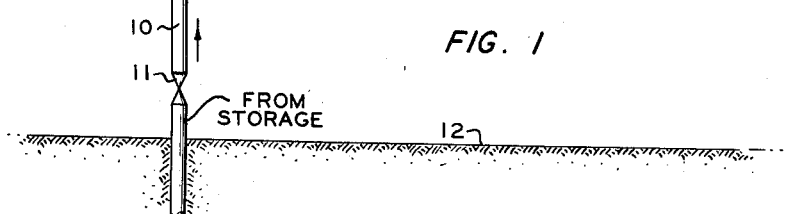
Figure 2:
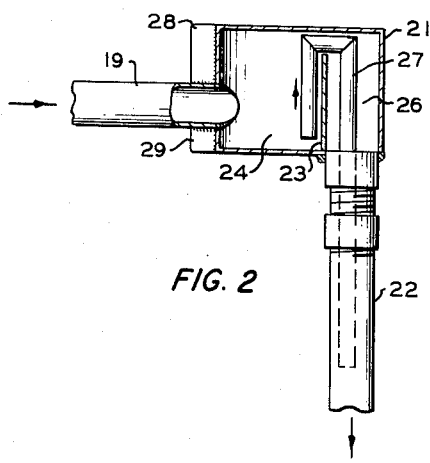

It is an object of my invention to eliminate the extensive and undesirable dripping from loading spouts employed in loading liquid hydrocarbon products into tank cars and trucks. It is another object of my invention to provide an improved adjustable, non-dripping loading pipe which can be employed to load fluid products from storage into transferable containers. Another object of my invention is to provide the means by which the undesirable dripping from refinery and bulk plant loading spouts can be substantially eliminated without changing the necessary operating procedures normally employed at such plants. Other objects, advantages and features of my invention will be apparent to those skilled in the art from the following discussion and the drawing in which:

Figure 1 is an elevation of a bulk plant loading system showing the adjustable spout and the preferred position of my anti-drip trap in the spout, and Figure 2 is a sectional view of the anti-drip trap with its siphon tube.

While my invention was developed specifically for use in loading operations of hydrocarbon product, particularly fuels such as, gasoline, oil, and the like, it will be appreciated by those skilled in the art that a variety of other applications can be made where it is desired to transfer fluid materials through a draining conduit and prevent dripping of the product draining from the walls of the conduit after the transfer operation is terminated. By the term "draining conduit" I refer to any pipe, tubing, or channel or series thereof, inclined or vertical, or vertical and horizontal, positioned so that fluid contained therein will tend to flow therethrough by force of gravity.

To more fully explain my invention reference is made to the drawings which set forth a preferred embodiment thereof. It will be readily apparent that several modifications can be made without departing from the spirit or scope of my invention.

Figure 1 shows an elevation of a bulk plant loading system with a conventional, adjustable loading spout that can be moved to any position over a relatively wide radius as required by the position of the tank truck or other container being filled. Hydrocarbon product, such as gasoline or fuel oil, is supplied from storage tanks, not shown, through suitable pumps, likewise not shown, to the adjustable loading spout. The hydrocarbon product passes to the spout through conduit 10. Flow of the fuel can be controlled by valve 11 which is readily accessible to the operator from loading area 12. Although not shown, a conventional loading platform can be used in which case valve 11 would be appropriately located in line 10. The fuel from line 10 passes through a horizontal length of piping 13 which has in its downstream end a spring loaded check valve 14. The purpose of this valve is to prevent further dripping as a result of product draining from the horizontal pipe 13 and it also reduces the flow of product after valve 11 has been shut off so that the operator loading the transfer container can more accurately estimate when valve 11 should be closed so that the remaining product draining from the loading pipe will not overflow the container. Check valve 14 is forced open by the pressure of the fluid when valve 11 is opened. When the pressure is relieved by closing valve 11, check valve 14 is closed so that there is no further flow of product from horizontal pipe 13.

The anti-drip trap of my invention is especially advantageous when employed in cooperation with such a check valve as it provides an added safety feature in case check valve 14 does not seat properly or for some reason an absolute seal is not provided. If check valve 14 is employed and there is a slight bit of leakage through this valve it can readily be appreciated that a considerable amount of product will leak from the loading pipe until pipe 13 has been drained.

Downstream from check valve 14, conduit 13 is connected to a vertical length of conduit 16 which in turn is pivotally connected by joint 17 to a horizontal length of piping 18. Horizontal pipe 18 is in turn connected to a horizontal pipe 19 of about the same length through swing joint 20. In conventional loading systems pipes 18 and 19 are about 3 to 4 feet in length so that the relative movement provided by pivoting connecting joints 17 and 20 permits the loading spout to be positioned over any point within a circle having a 6 to 8 foot radius. With such a piping system, even if check valve 14 provides a tight seal, the amount of product draining over a period of time from the walls of conduits 16, 18 and 19 and from connections 17 and 20 provides a considerable accumulation. This would present a safety hazard if this amount of material were permitted to accumulate in a working area over any length of time. Such dripping is prevented, however, by the drip trap in chamber 21 which is positioned at the end of conduit 19 and which provides communication between conduit 19 and loading pipe 22. Loading pipe 22 is generally a telescoping conduit so that its length can be adjusted to meet the demands of varying heights of trucks or transfer containers that are to be filled with this loading system.

To further describe the anti-drip trap reference is now made to Figure 2 which shows a preferred form of my invention in section. As pointed out previously, horizontal pipe 19 communicates through chamber 21 with the vertical discharge pipe 22. The anti-drip trap comprises a chamber or outer shell 21 which is closed except for the openings through which connection is made between pipes 19 and 22. This chamber is divided internally by weir or baffle 23 which provides a liquid-tight seal in the lower portion of the chamber and thus divides the chamber into an inlet section 24 and an outlet section 26 which communicate over the top of baffle 23.

Sufficient space is left at the top of baffle 23 so that the cross section of the loading conduit is not substantially reduced and the flow of product through the system is not materially restricted. Preferably, as shown, chamber 21 and baffle 23 extend above the upper level of conduit 19 so that conduit 19 can be completely filled without draining over the top of baffle 23. The inlet section 24 of chamber 21 is completely filled with fluid during normal loading procedure and the flow of product also passes through siphon tube 27 which extends from the lower portion of inlet section 24, up over the top of baffle 23, and downwardly to a point within discharge pipe 22 substantially below the bottom of chamber 21.

The size and length of siphon tubing 27 will vary depending upon the size of the conduits employed in the loading pipe but the diameter of the siphon tube should be substantially smaller than the diameter of the discharge pipe 22. The relative lengths of the long and short ends of the siphon tube should be such that a positive siphoning effect is readily obtained. For example, when standard 4-inch pipe is employed for the loading conduits, the siphon tube can be suitably constructed from 1½-inch piping or electrical conduit with the short end of the siphon tube in inlet section 24 about 8 inches long and the long end of the siphon tube in outlet section 26 and discharge pipe 22 about 33 inches long.

During the loading operation siphon tube 27 is filled and when valve 11 is closed, check valve 14 likewise closes, and the bulk of the product in conduits 16, 18, 19 and 22 drains into the tank truck. As can be seen, material from conduits 16, 18 and 22 will drain by gravity and material from conduit 19 will be emptied by the siphoning effect through tube 27 so that conduit 19 and most of inlet section 24 is quickly emptied within a few seconds after valve 11 is closed. The fuel loading piping can then be removed from its position over the tank truck and any dripping as a result of fluid draining from conduits 16 and 18 and connections 17 and 20 or as a result of an imperfect seal in check valve 14 will collect in inlet section 24 and horizontal pipe 19. Preferably, the volume of pipe 19 with inlet section 24 is sufficient to hold all of the product from conduit 13 so that if check valve 14 does not close perfectly, the dripping which would otherwise result is prevented.

During the time in which liquid is being siphoned from chamber 24 through tube 27 there is very little fluid flowing through loading pipe 22, the main flow of fluid having been cut off at a check valve 14. Air can therefore enter chamber 21 by passing through loading pipe 22 and then over the top of partition 23 to chamber 24. A conventional manner of facilitating draining from such a loading pipe after a valve has been closed is to employ a vacuum breaker, for example, positioned adjacent valve 14 and downstream thereof. Such a vacuum breaker is not shown in the drawing for it has no direct bearing on the operation of the drip trap. However, such vacuum breakers are conventional.

Chamber 21 is braced structurally by fins 28 and 29 which are welded to chamber 21 and pipe 19. Siphon tube 27 can be poistioned so that its lowermost end bears against the wall of pipe 22 thus helping to secure it in position and aiding in draining this tube. Other modifications will be apparent to those skilled in the art from my above disclosure.

I claim:

1. In a fuel transfer system, an adjustable non-dripping loading pipe comprising a horizontal feed pipe, a spring-loaded check valve in the downstream end of said feed pipe, a vertical conduit below said horizontal feed pipe and connected to the downstream end thereof, a first horizontal conduit pivotally connected at one end to the other end of said vertical conduit, a second horizontal conduit disposed below said first horizontal conduit, a swing joint pivotally connecting the other end of said first horizontal conduit with one end of said second horizontal conduit, an enlarged chamber at the other end of said second horizontal conduit, a vertical weir positioned in said chamber dividing same into an inlet section and an outlet section, said sections communicating over the top of said weir, said second horizontal conduit being connected to the side of said inlet section, a telescoping vertical discharge pipe below said chamber and connected at one end to the bottom of said outlet section, and a siphon tube substantially smaller in diameter than said discharge pipe and extending from near bottom of said inlet section of said chamber, over the top of said weir and down said discharge pipe to a point substantially below said chamber.

2. An adjustable fuel loading pipe system made up of pivotally connected conduits terminating with a lowermost discharge conduit and a valve positioned in one of said conduits upstream from said discharge conduit, a drip trap between said valve and said discharge conduit comprising a chamber, a partition dividing the lower portion of said chamber into an inlet section and an outlet section, said sections communicating over the top of said partition, said inlet section being connected to an upstream conduit and said outlet section being connected at its bottom to said discharge conduit, and a siphon tube having a diameter substantially smaller than said discharge conduit extending from near the bottom of said inlet section of said chamber, over the top of said partition and down said discharge conduit to a point substantially below said chamber.

References Cited in the file of this patent

UNITED STATES PATENTS

| 358,677 | Kommerell | Mar. 1, 1887 |
| 1,275,964 | Metzger | Aug. 13, 1918 |
| 1,713,424 | Davenport | May 14, 1929 |
| 2,604,112 | Thorsheim | July 22, 1952 |
| 2,722,230 | Toussaint | Nov. 1, 1955 |

FOREIGN PATENTS

| 19,514 | Great Britain | A.D. 1892 |